United States Patent [19]

Grimes et al.

[11] 3,992,292

[45] Nov. 16, 1976

[54] MOVING BELT-TYPE OIL SKIMMER WITH PROPULSION INDUCED FLOW, METHOD AND APPARATUS

[75] Inventors: Eldon L. Grimes; David W. Lerch, both of Seattle, Wash.

[73] Assignee: Marine Construction & Design Co., Seattle, Wash.

[22] Filed: Oct. 15, 1974

[21] Appl. No.: 514,814

[52] U.S. Cl. .................. 210/30 A; 210/DIG. 26; 210/242 AS
[51] Int. Cl.² ............... B01D 15/06; E02B 15/04
[58] Field of Search ............... 210/36, 40, 83, 242, 210/DIG. 21, 30

[56] References Cited
UNITED STATES PATENTS

| 3,314,540 | 4/1967 | Lane | 210/242 |
| 3,539,508 | 11/1970 | Bulkley | 210/242 |
| 3,700,593 | 10/1972 | Bezemer et al. | 210/40 |
| 3,732,161 | 5/1973 | Grutsch et al. | 210/DIG. 21 |
| 3,744,257 | 7/1973 | Spanner | 210/DIG. 21 |
| 3,810,546 | 5/1974 | Oxenham | 210/DIG. 21 |
| 3,812,968 | 5/1974 | Aramaki et al. | 210/DIG. 21 |
| 3,823,828 | 7/1974 | Derzharets | 210/DIG. 21 |

*Primary Examiner*—Theodore A. Granger
*Attorney, Agent, or Firm*—Christensen, O'Connor, Garrison & Havelka

[57] ABSTRACT

An oil spill recovery method and apparatus utilizing a low-resistance flow-through endless belt of reticular oleophilic, hydrophobic material and forced flow of water with oil through the belt through induction effected by propulsion means operating at a position immediately behind and beneath the submerged active portion of the belt.

9 Claims, 5 Drawing Figures

U.S. Patent  Nov. 16, 1976  3,992,292
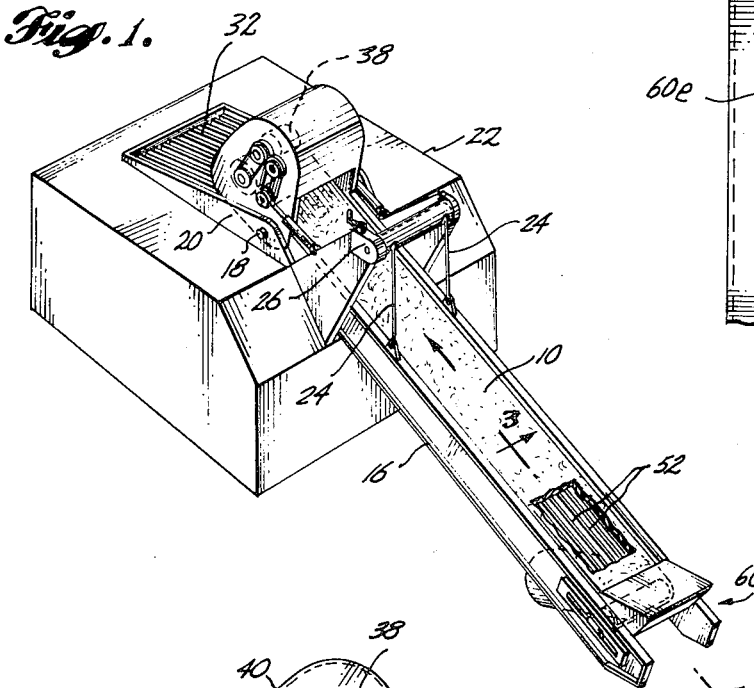
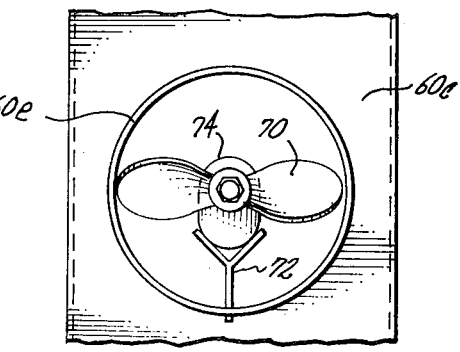
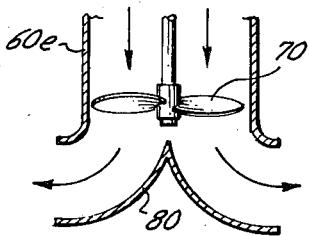
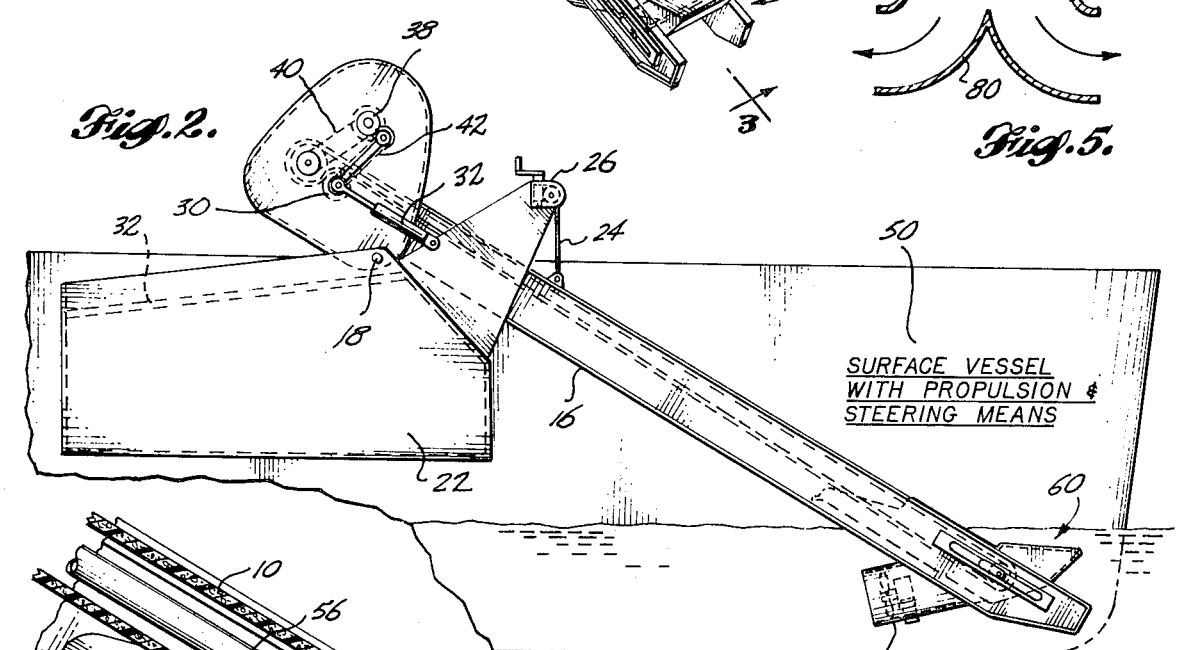
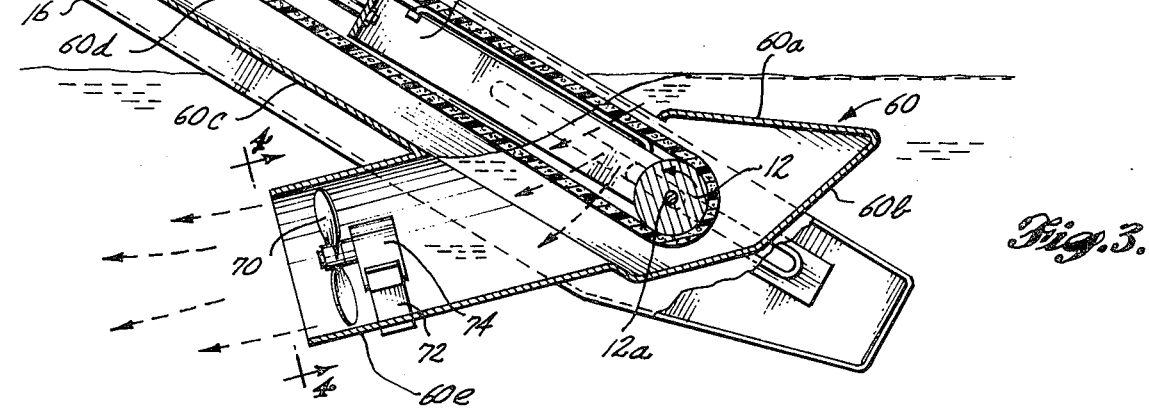

MOVING BELT-TYPE OIL SKIMMER WITH PROPULSION INDUCED FLOW, METHOD AND APPARATUS

BACKGROUND OF THE INVENTION

This invention relates to improvements in oil spill recovery devices, particularly those of the type employing an endless reticular foam belt as disclosed in copending application Ser. No. 327,007, filed Jan. 26, 1973. While the invention is not confined in its application to mobile skimmer vessels operable on open water, it is herein illustratively described in such application. However, it will be appreciated that certain modifications and changes therein with respect to details may be made without departing from the essential features involved.

In order for a low-resistance flow-through filter belt of the type described to operate most effectively at maximum recovery rate, water bearing oil must not only have free access to the belt but must readily pass through the belt's thickness in preference to flowing around the belt. With such a low-resistance flow-through belt, the percentage of open pore area to total area of the belt presented to the flow in any cross section is sufficiently large that there is a natural tendency for the water to flow freely through it if there is no external barrier and no internal plugging or clogging. During such passage of the water, entrained oil is attracted to and held by the myriad of belt fibers which it contacts in the process of passage. According to the preferred operating technique with such a belt, the fibers are permitted to accumulate oil to a small percentage such as 15% of the belt's overall volume before the exposure to flow is interrupted, the belt purged of the accumulations, and the process repeated. In that manner the belt remains a free flow-through filter body, can be moved rapidly through the water without forcing the water to by-pass it, and, by the repetitious frequent purging of oil and reentries of the belt into the flow, can over a given period of time, recover great quantities of oil while leaving the processed water clean.

In the case of an endless filter belt moving with its lower portion submerged in the water and its upper portion out of water to permit purging it of oil, the speed of the belt's motion in its endless path must be sufficient to limit the accumulation of oil to less than the adsorption capacity of the belt so that the belt does not fail to attract and hold freshly encountered oil in performing its desired continued oil recovery action. Thus, in a practical mobile skimmer vessel using such an endless filter belt system, the belt is driven at a fairly rapid speed in its circuit, such as four linear feet per second. At such relatively high speeds, however, two conditions can develop which impair the belt's effectiveness as a free flow-through filtration medium capable of processing large volumes of water. First a certain amount of air is carried down into the water by the downwardly moving back stretch of the belt. Some of this air remains trapped on or in the belt. Some is released as a curtain of bubbles as the belt rounds the submerged guide roller and starts back up the upper or front stretch. Both effects of the retained air present some obstacles to free flow-through of the water to be filtered.

Secondly the rapid upward motion of the belt's front stretch leaving the water causes the belt to carry with it substantial volumes of water. This water raised as a wall or sheet immediately in front of the belt's front stretch, forms what amounts to a dynamic shield or barrier to free flow-through of oncoming surface water.

These two problems, just identified, become particularly acute when attempting oil spill recovery with little or no relative forward motion of the skimmer vessel, or when operating the recovery system in a stationary installation when little ambient current flows so as to carry the oil with water by force of the current itself through the recovery belt.

The present invention is directed generally to method and apparatus improvements by which these difficulties are largely overcome in a practical manner not adding unduly to the cost or complexity of the equipment, and not decreasing its recovery effectiveness (i.e., its filtration efficiency to remove all or most of the oil from water processed). A more specific object is to devise a flow enhancement means associated with the filter belt in such a manner that it does not agitate the water nor disperse or emulsify the oil, nor otherwise interfere with the filtration or separation function.

Still another object of the invention is to devise an improved mobile oil skimmer vessel more effective at widely varying operating speeds than heretofore, ranging from standstill to the highest speeds of which the belt system can be operated while functioning effectively.

A related object is to provide an oil recovery belt system for stationary or mobile applications wherein, without impairing recovery efficiency, the belt speed may be varied over a wide range to suit volumetric recovery rate imposed by the degree of concentration of the oil and relative movement of the water in relation to the system.

BRIEF DESCRIPTION OF THE INVENTION

In accordance with this invention, it is found possible to greatly increase the effectiveness and recovery rates obtained with an endless filter belt type oil spill recovery device of the type described, particularly on skimmer vessels, but also in stationary applications, by mounting in the path of water flow immediately behind and beneath the filtering region of the submerged lower portion of the inclined filter belt flow induction means directing its thrust rearwardly and with flow channeling means in substantially sealed relationship with the belt so as to cause or increase rearward flow of surface water through the belt by induction and to prevent oil by passing the belt. For this purpose preferably a conventional propeller in a flow channeling duct means is mounted and driven on an axis preferably slightly inclined rearwardly and downwardly so that both downward and rearward thrust components are exerted on the water. By mounting the propeller on the side of the belt opposite that approached by the oncoming water and surface oil, the propeller does not disperse and emulsify the oil, yet provides the differential head necessary to overcome the obstruction and barrier effects previously described.

These and other features, objects and advantages of the invention will become more fully evident from the following description by reference to the accompanying drawings.

BRIEF DESCRIPTION OF DRAWINGS

FIG. 1 is an isometric view of an oil-water separation device of the endless belt type incorporating the invention, in an embodiment suitable either for mounting on a mobile surface vessel or in a stationary installation.

FIG. 2 is a side elevation view of the improved oilwater separation device as mounted on the forward portion of a catamaran type oil skimmer vessel.

FIG. 3 is a sectional view on an enlarged scale taken on line 3—3 in FIG. 1.

FIG. 4 is an end view of the propeller device taken on line 4—4 in FIG. 3.

FIG. 5 is a schematic diagram illustrating a flow diverter means which may be used in instances wherein net propeller thrust on the vessel or other support is to be avoided.

DESCRIPTION OF THE ILLUSTRATED EMBODIMENT

As illustrated, the endless filter belt 10 is preferably in the form of a three dimensional network employed as disclosed in the above-cited pending application. In a practical case this filter network is made of reticular expanded polyurethane foam material, hydrophobic and olephilic, with pores or openings predominantly in the range approximately 0.10 inch to 0.15 inch span and with network strands defining those openings of a thickness representing a few percent of the opening span dimension. In the illustration, the filter belt is shown to be a foot or so wide and approximately one inch thick, and is guided around end rollers to move in an elongated inclined circuitous path. At the lower end of this path the belt is guided around a roller 12 and at its upper end around a roller 14. The roller 12 is journaled on an axle 12a supported by and extending between side plates of a movable support frame 14. The latter is mounted to slide adjustively lengthwise in a main frame 16 so as to permit increasing or decreasing belt tension. Frame 16 is pivoted on a horizontal axis near its upper end on transverse side pins 18 mounted on the upstanding plates 20 of a box-like base 22 serving also as an oil receiving tank. Cables 24 suspend the main frame 16 from a basemounted winch 26 which permits raising and lowering the main frame and thereby varying its downward inclination angle, and thereby the depth to which the lower end of the filter may be submerged in the water (FIG. 2). When traveling between jobs the winch can hoist the main frame 16 to a substantially horizontal position.

The filter belt 10, in passing around the roller 14, is reversely deflected around a squeeze roller 30 which compresses the best material against the roller 14 to squeeze out the oil. Pressure for the roller 30 is provided by a hydraulic piston and cylinder unit 32. The expressed oil drops into the box-like base 22 where it is stored and/or pumped away for disposal. Sticks, seaweed and other debris carried upward by the filter belt's upper stretch 10 drop over the roller 14 and collect in the open drainage grid 32 mounted over the open top of the receptacle base 22.

Preferably, the endless filter belt is driven by a hydraulic motor 38 through a chain and sprocket drive 40 turning the frictional drive roller 14, and also through an auxiliary chain and sprocket drive 42 turning the squeeze roller 30, also applying frictional driving force to the belt. The direction of drive is such that the upper stretch of the belt 10 moves upwardly out of the water. Hence, with the oil spill recovery belt system mounted on a skimmer vessel such as between the hulls of a catamaran vessel 50 (FIG. 2) the belt's upper stretch moves with a horizontal component directed oppositely to the forward motion of the vessel and thereby reduces the effective net relative rate of motion of the belt and the surface layer of water which it is to process. This reduction lends further importance to the flow induction effect utilized in this invention in order to create or insure the desired free flow-through processing action. In FIG. 2 it will be appreciated that vessel 50 has a suitable or conventional propulsion and steering system and other features appropriate to its applicaion not illustrated in the drawings.

As further depicted in the drawings, the belt's upper stretch is supported by and slides upon the rods 52 of a flat backing grid extending lengthwise of the main frame 16. This grid, while permitting water to drain freely out of the belt, supports the belt against sagging or bulging downward under the force of impact of the water and under its own weight stretched between the rollers 12 and 14.

Positioning tension in the belt is established by a hydraulic piston and cylinder unit 56 reacting between the main frame 16 and the shuttle frame 15 so as to force the guide roller 12 downwardly lengthwise of the main frame. The shuttle frame 14 also supports a cowling structure including a nose fairing 60 which has an upper panel 60a located slightly above and ahead of the forward lower portion of the filter belt and a lower panel 60b joined with and at an acute angle with the upper panel 60a to form a tapered prow ahead of the lower roller 12. In operation, the wedge-shaped prow's horizontal leading edge located ahead of the belt below the water's surface "peels" or separates off the surface zone of water which carries the oil to help insure its confinement in a path of impact upon the submerged belt. Moreover, the hollow interior of the prow defined between the two panels 60a and 60b provides a region in which water being "pumped" by the belt may circulate freely and thus reduce the current or sheet of water carried with the belt upwardly along the upper stretch after it rounds the roller 12.

Also part of shuttle frame 14, the lower plate 60b is joined with a bottom panel 60c that underlies the lower stretch of the belt 10 for a short fraction of its length. Upstanding side panels or flanges 60d are joined to opposite edges of the bottom panel 60c for stiffening and mounting purposes.

The panel 60c has a large circular aperture, approximately the width of the filter belt, around the edge of which is joined a round duct or cowling 60e projecting aft and downwardly therefrom. The cowling 60e serves as a duct or flow channeling means for a propeller 70 mounted therein on a support 72 which carriers the hydraulic motor 74 operable to rotate the propeller as an impeller located generally on the side of lower belt guide roll 12 and beneath the upper guide roll associated with squeeze roll 30. The axis of the propeller and the coinciding axis of the shroud or duct 60e are preferably inclined rearwardly at a small downward angle to the water's surface with the main frame 16 disposed in its operable position.

During operation of the system with the belt 10 driven to move in its endless path by the motor 38, the propeller 70 is driven by the motor 74 to create flow of water downwardly and aft through the duct 60e. This results in induced rearward flow of water through the filter belt's submerged upper and lower stretches drawn from the surface region overlying the upper noseplate 60 as depicted in FIG. 3. The thrust and volumetric drive capacity of the propeller 70 to create flow and to augment that occuring from relative motion between the ambient water and the filter system, is greately effective to overcome the previously described impediments to the desired free flow-through action in the filter belt. Because of its location immediately behind the two stretches of filter belt, line 27, after "belt," insert and the confining effect of the flow channeling means 60d, 60e, and the propeller's contribution to flow is by way of induction of flow directly aft through the belt, with by-passing of the belt by water carrying oil around the sides or bottom of the belt. Although the propeller itself creates considerable turbulence adjacent its blades this is found to have negligible deleterious effect in terms of dispersing or emulsifying oil ahead of the filter belt; hence the belt's effectiveness to separate oil from the water despite the inductively increased flow of water through it is not impaired by the propeller action.

Thus, instead of the oil form by oncoming water tending to bypass and avoid the filter belt under operating conditions by flowing under and around the belt, as tends to occur when the vessel is moving at appreciable speeds ahead, the action of the propeller effectively enhances the flow-through action of the belt and greatly increases the volumetric processing capacity of the system. It enables driving the filter belt in its endless circuit path as fast as necessary to carry oil accumulations therein to the squeeze roller before they become excessive, on a continuous basis, without decreasing accessibility of the belt to oncoming water entry due to the previously described belt circulation speed-related air and water barrier effect.

In FIGS. 1–4 it will be recognized that the flow induction propeller 70 does not constitute the vessel's drive unit. For most practical applications the net propulsion effect of the propeller 70 in driving the main vessel is a very small percentage of the normally required drive power. In the illustration of FIG. 5, a modified propeller duct or shroud 60e is shown having oppositely directed discharge ports. The aft end of the duct is covered by a double diverter 80 which intercepts the flow of water drawn through the duct 60e by the propeller 70 and directs the flow laterally outward in equal parts and in opposite directions. The purpose of this arrangement is to nullify or cancel out any net thrust effect produced by the propeller 70 if desired in self-propelled skimmer vessel applications, for example, wherein the vessel itself should remain altogether stationary or at least kept soley under control of the main propulsion and steering system of the vessel.

It will be evident that the invention illustrated and described in a single preferred embodiment for a particular application, may be employed in other applications and in other forms wherein the same or a similar problem situation arises, and is thereby to be understood and interpreted by the scope of the claims which follow.

What is claimed is:

1. Oil spill recovery apparatus for removing oil from the surface of a body of water, such apparatus comprising an endless generally flat oil-water separation filter belt means of low-resistance flow-through construction defined by a three-dimensional openwork mesh operable to recover oil without bridging of the mesh openings, and means supporting and guiding the filter belt for motion lengthwise in a predetermined circuit path over a lower guide means, also upper guide means spaced apart from and above the lower guide means defining an inclined path for at least an upper reach portion of said belt, means to drive the belt lengthwise in its circuit path with said upper reach portion travelling upwardly along such inclined path whereby oil picked up by the belt is lifted out of the water and the water drains from the belt, means adjacent the upper guide means acting on the belt to remove oil therefrom, impeller means on the side of the belt adjacent to and generally beneath the upper guide means, and flow channeling means defining a flow channel with said impeller means located therein and constructed and arranged to define an inlet opening communicating with the inclined upper reach portion of said belt, said flow channeling means being substantially in sealing arrangement with the belt thereby defining a closed path for the flow of water drawn through at least said upper reach portion of belt by said impeller means.

2. The apparatus defined in claim 1, wherein the impeller means comprises a multiple-blade rotary propeller mounted in the flow channeling means immediately adjacent the belt on the side thereof from which water leaves the belt in said flow channel.

3. The apparatus defined in claim 1 combined with a mobile oil spill recovery vessel having separate propulsion and steering means and carrying said apparatus operably to sweep across an oil spill in a direction opposite motion of water in said flow channel passing through the belt.

4. A mobile surface vessel for recovery of oil spills, comprising hull means operable for movement across the surface of open water at a speed of at least a few knots, and endless generally flat oil-water separation filter belt means of low-resistance flow-through construction defined by a three-dimensional openwork mesh operable to recover oil without bridging of the mesh openings, means carried by said hull means supporting and guiding the filter belt for motion lengthwise in a predetermined circuit path over a lower guide means operable submerged in the water and an upper guide means spaced apart from the lower guide means defining an inclined path for at least an upper reach portion of said belt exposed for free access to and free traversal by surface region water bearing oil on-coming from ahead of the belt, means to drive the belt lengthwise in its circuit path with said upper reach portion travelling upwardly along such inclined path whereby oil picked up by the belt is lifted out of the water while water drains freely from the belt, means mounted in position on the vessel to act on the belt for removing such oil therefrom as the belt circulates, impeller means mounted submerged on the side of the belt adjacent to and generally beneath the upper guide means, and flow channeling means defining a submerged flow channel including said impeller means located therein and constructed and arranged defining an inlet opening communicating with the inclined upper reach portion of said belt, said flow channeling means being in substantially sealing arrangement with the belt defining a closed path extending aft from the belt for the flow of water drawn through at least said upper reach portion of belt while preventing loading of the impeller means by water being drawn around the belt and thus by-passing such belt.

5. The vessel defined in claim 4 wherein the hull means comprise transversely spaced hull portions, the filter belt means being mounted and guided in the space between such hull portions, and the impeller means comprises a multiple-blade rotary propeller means mounted in the flow channeling means.

6. Oil spill recovery apparatus for removing oil from the surface of a body of water, such apparatus comprising and endless generally flat oil-water separation filter belt means of open mesh low-resistance flow-through construction permitting water to be drawn freely through the mesh openings while submerged so as to bring oil into contact with the mesh, and means supporting and guiding the filter belt for motion lengthwise in a predetermined circuit path over a lower guide means, also upper guide means spaced apart from and above the lower guide means defining an inclined path for at least an upper reach portion of said belt, means to drive the belt lengthwise in its circuit path with said upper reach portion travelling upwardly along such inclined path whereby oil picked up by the belt is lifted out of the water and the water drains from the belt, means adjacent the upper guide means acting on the belt to remove oil therefrom, impeller means on the side of the belt adjacent to and generally beneath the upper guide means, and flow channeling means defining a flow channel with said impeller means located therein and constructed and arranged to define an inlet opening communicating with the inclined upper reach portion of said belt, said flow channeling means being substantially in sealing arrangement with the belt thereby defining a closed path for the flow of water drawn through at least said upper reach portion of belt by said impeller means.

7. The method of recovering oil from an oil spill on open water while separating the water from te recovered oil employing an endless generally flat oil-water separation filter belt means of low-resistance flow-through construction defining a three-dimensional openwork mesh operable to recover oil without bridging of the mesh openings, comprising the steps of positioning a reach of said belt at an incline partially submerged, driving the belt in an endless path including said inclined reach in which the belt moves upwardly from the water whereby oil picked up by the belt is lifted from the water and the water drains from the belt, purging the belt of oil lifted from the water at a location above said inclined reach, inducing flow of water through the submerged portion of the inclined reach of belt by applying flow induction force on the water at a location adjacent one side of said submerged portion to induce flow through the belt in a direction generally transverse to said side, and confining said induction force induced flow substantially to a flow channel extending from said side substantially to and beyond said flow induction location by providing a sealing barrier along such flow channel that prevents said induction force drawing water around the belt to by-pass the same.

8. The method defined in claim 7 and the attendant additional step of moving the filter belt means bodily in translation across the water's surface in a direction substantially opposite that in which water is drawn through the belt by said applied flow induction force.

9. The method of recovering oil from an oil spill on open water while separating the water from the recovered oil employing an endless generally flat oil-water separation filter belt means of open mesh low-resistance flow-through construction permitting water to be drawn freely through the mesh openings while submerged so as to bring oil onto contact with the mesh, comprising the steps of positioning a reach of said belt at an incline partially submerged, driving the belt in an endless path including said inclined reach in which the belt moves upwardly from the water whereby oil picked up by the belt is lifted from the water and the water drains from the belt, purging the belt of oil lifted from the water at a location above said inclined reach, inducing flow of water through the submerged portion of the inclined reach of belt by applying flow induction force on the water at a location adjacent one side of said submerged portion to induce flow through the belt in a direction generally transverse to said side, and confining said induction force induced flow substantially to a flow channel extending from said side substantially to and beyond said flow induction location by providing a sealing barrier along such flow channel that prevents said induction force drawing water around the belt to by-pass the same.

* * * * *